May 21, 1963
G. W. ARMSTRONG
3,090,452
PERCENTAGE INDICATING SCALE
Filed Feb. 21, 1958
3 Sheets-Sheet 1
FIG-1
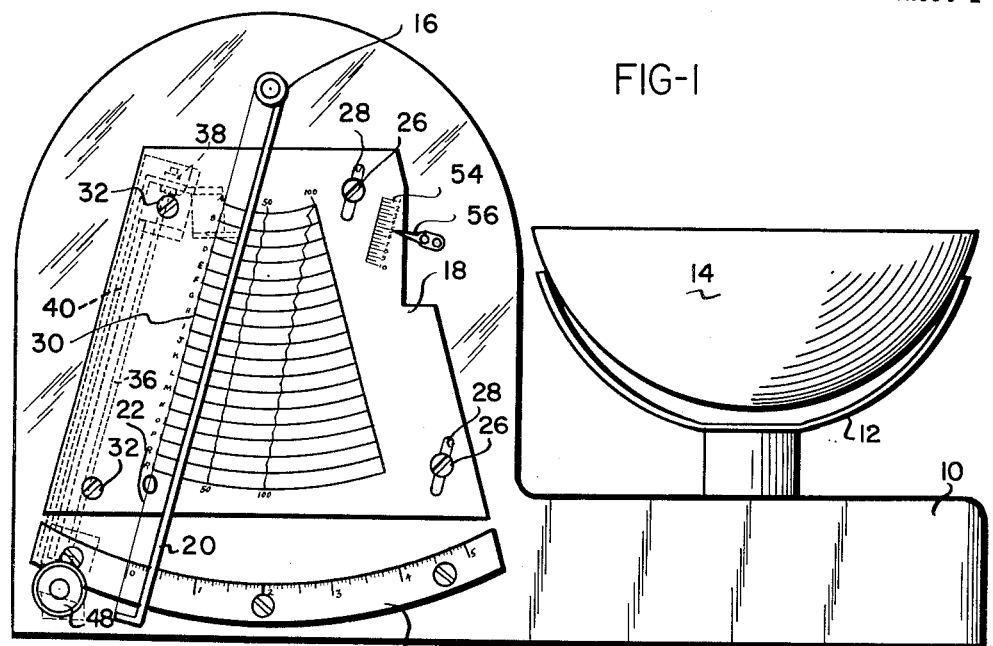
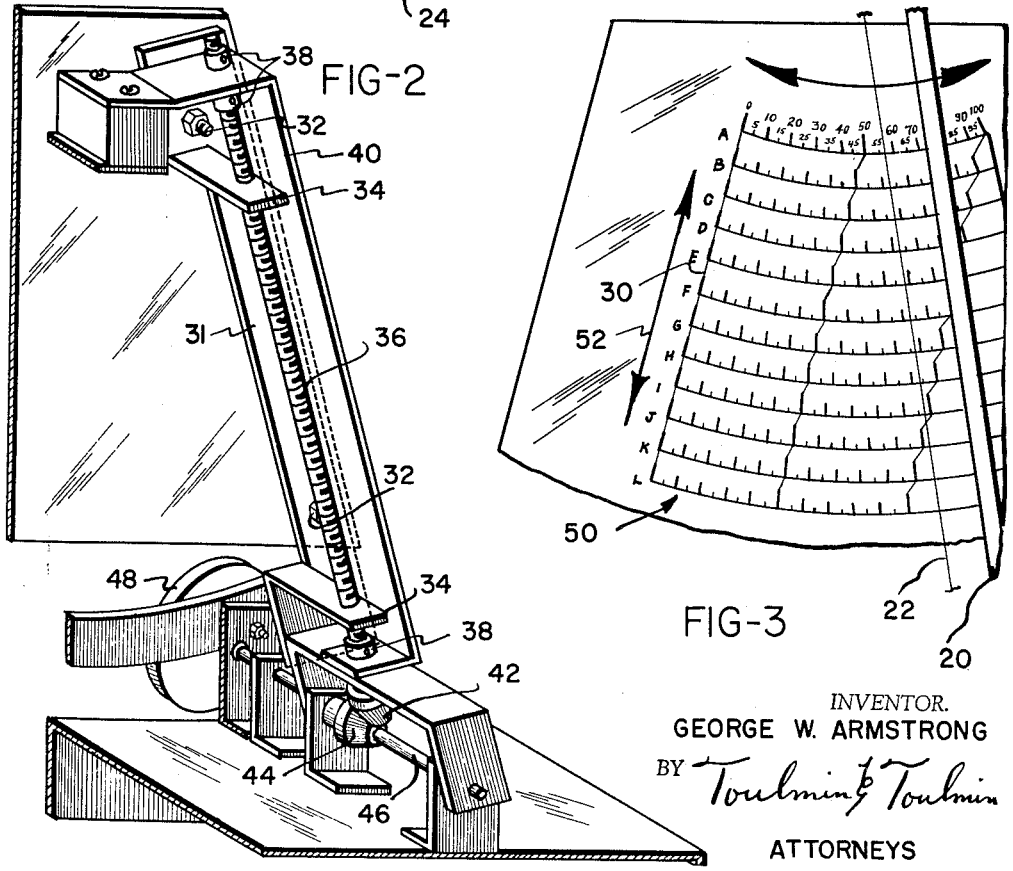
FIG-2
FIG-3
INVENTOR.
GEORGE W. ARMSTRONG
BY *Toulmin & Toulmin*
ATTORNEYS May 21, 1963  G. W. ARMSTRONG  3,090,452
PERCENTAGE INDICATING SCALE
Filed Feb. 21, 1958  3 Sheets-Sheet 2
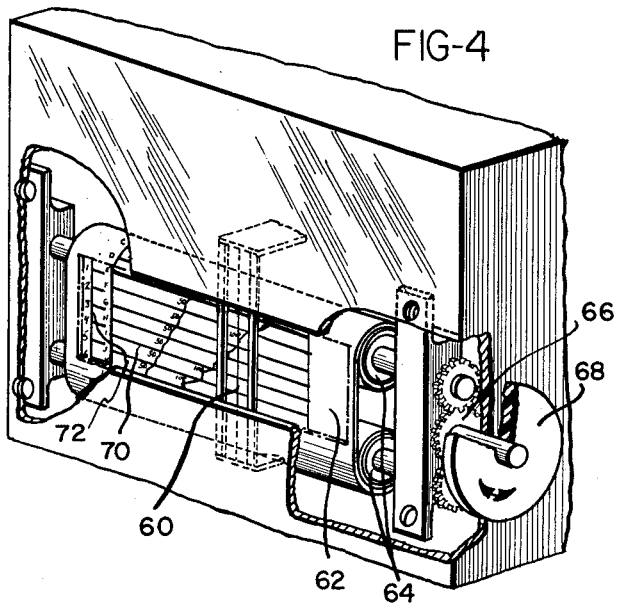
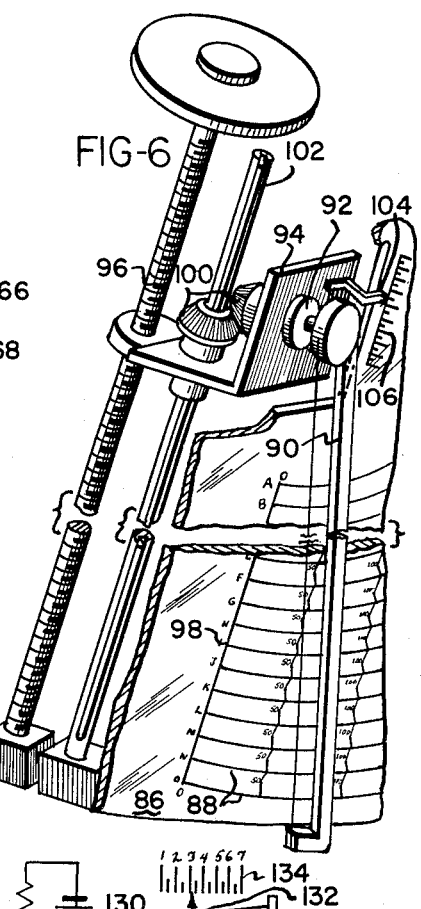
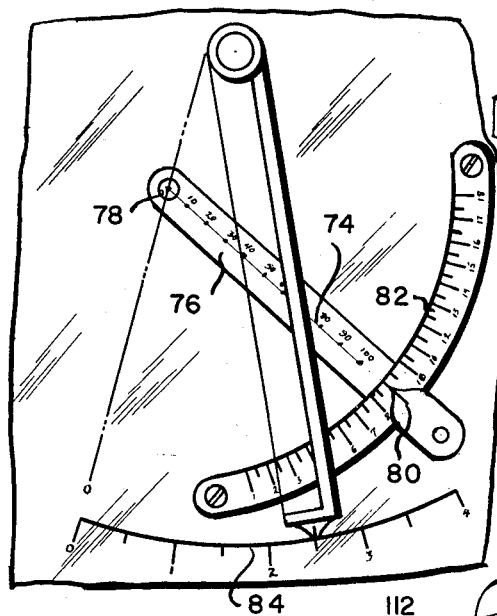
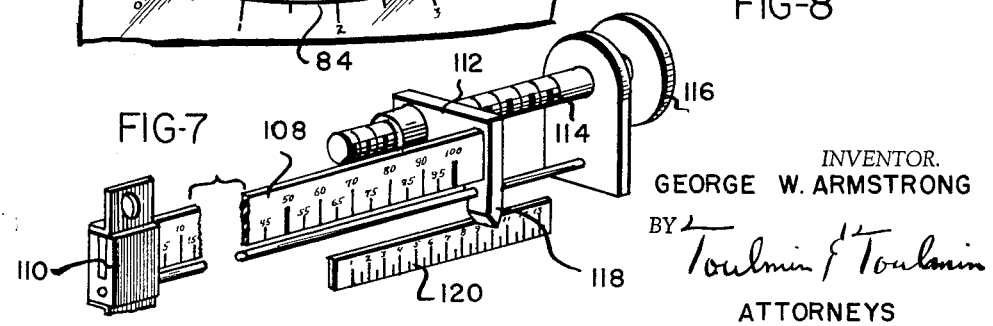
INVENTOR.
GEORGE W. ARMSTRONG
BY Toulmin & Toulmin
ATTORNEYS May 21, 1963
G. W. ARMSTRONG
3,090,452
PERCENTAGE INDICATING SCALE
Filed Feb. 21, 1958
3 Sheets-Sheet 3
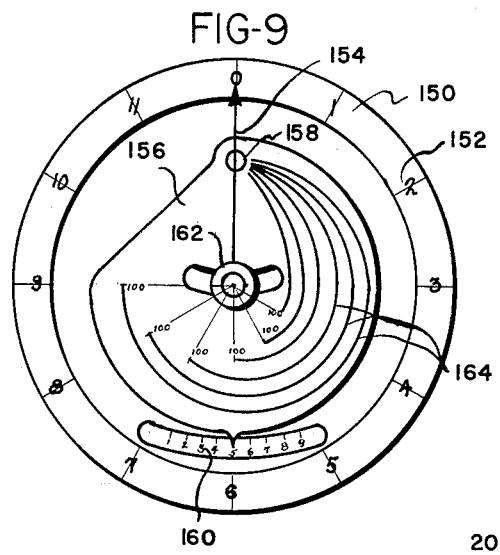
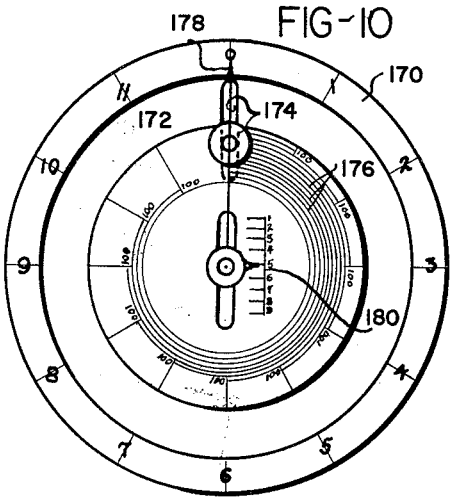
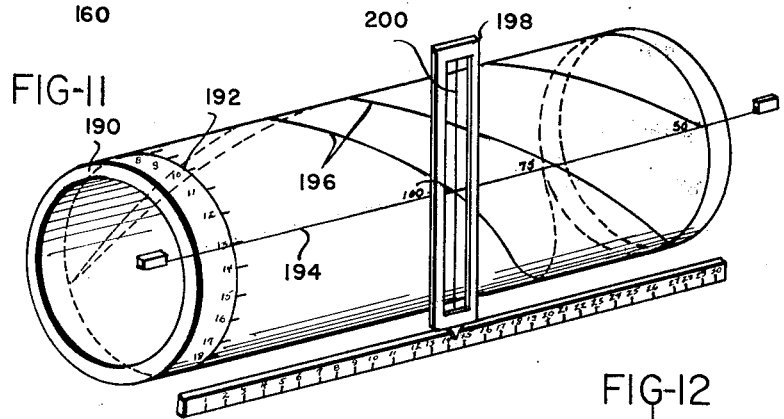
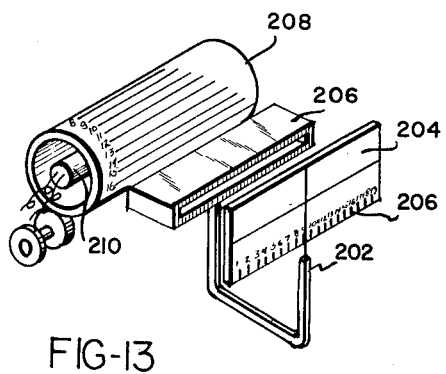
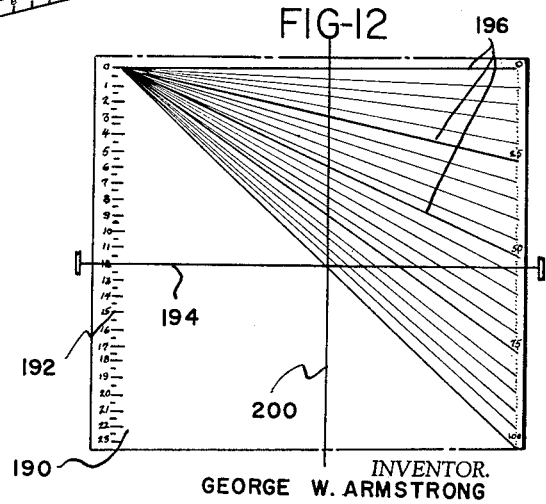
INVENTOR.
GEORGE W. ARMSTRONG
BY Toulmin & Toulmin
ATTORNEYS

# United States Patent Office 3,090,452
Patented May 21, 1963

3,090,452
PERCENTAGE INDICATING SCALE
George W. Armstrong, 284 E. Dayton Drive,
Fairborn, Ohio
Filed Feb. 21, 1958, Ser. No. 716,619
3 Claims. (Cl. 177—41)

This invention relates to weighing devices, and particularly to weighing devices in which the weighing operation is accompanied by a computation.

Weighing devices that compute prices and the like are known, as are weighing devices in which, in addition to the weight of an object or sample, there is indicated a predetermined percentage of the weight of the object or sample.

The present invention deals with a weighing mechanism of a type in which the total weight indication is not particularly important but in which it is important to determine the percentage of the total weight of a certain fraction of the total sample.

Such a weighing operation occurs, in particular, in connection with grain, and the like, which is delivered to a mill for sale. Such grain is ordinarily sampled by taking small amounts from different places in the grain load, thus making up a sample which is then weighed, and thereafter the trash and foreign matter is separated from the sample and the remaining portion of the sample is reweighed and the new weight indication is divided by the weight of the total sample to arrive at the fraction of the rated price of the grain that will be paid. A weighing and computing operation of this nature is time consuming and subject to error, and the present methods are objectionable for that reason and are particularly objectionable when a number of samples are to be weighed in succession.

In other cases, it may be desired to make up a batch from its component ingredients, with the said ingredients being supplied as predetermined percentages of the total weight. In this case, again, the total weight is not particularly important but the percentages of the individual ingredients must be correct to arrive at the proper end result.

Having the foregoing in mind, it is a primary object of the present invention to provide a weighing device particularly adapted for carrying out weighing operations of the nature referred to above.

Another object of this invention is the provision of a weighing device and a method of weighing articles and samples such that a simple indication of the percentage of a portion of the article or sample is readily had and without any time consuming difficult computations which might easily be in error.

It is also an object of this invention to provide a simple inexpensive weighing mechanism especially adapted for indicating percentages of a sample or batch substantially independently of the weight of the sample or batch.

In general, the objectives of the present invention are attained by constructing a weighing device in which there is a pan or the like to receive a sample or ingredients of a batch, and which weighing device includes an indicator movable relative to a graduated chart. The length of the scale on the chart is arranged for being changed as to its effective length without changing the zero position that will be indicated when the pan is unloaded. The graduated scale is graduated in percentages and by being adapted for having its effective length changed, it is possible to cause the 100% mark to register with the indicator under varying conditions of load in the pan whereby any less load, which will be attained by removing a part of the sample, would cause the indicator to indicate on the scale the percentage of the original sample by remaining in the pan.

According to a preferred modification the chart is adjustable relative to the indicator, and in another modification the indicator is adjustable relative to the chart.

In still another modification an electrical indicator is employed, and the effective length of the scale is adjusted by varying a resistant associated with the electrical instrument.

In all cases the characteristic feature is present that the zero indication is always the same and there is means, in the form of indicia, for indicating the relative adjustment of the chart and indicator.

The several objects and advantages of the present invention will become more apparent upon reference to the following specification taken in connection with the accompanying drawings in which:

FIGURE 1 is a more or less diagrammatic view of a weighing mechanism embodying the present invention, FIGURE 2 is a perspective view showing more in detail the adjusting mechanism associated with the movable chart of the FIGURE 1 modification, FIGURE 3 is a fragmentary enlarged view showing the position of the indicator relative to the chart when the pan of the weighing device has been loaded and before the chart is adjusted, FIGURE 4 is a diagrammatic perspective view showing the present invention adapted to a different sort of indicator and with the chart being an elongated flexible element rolled up on a pair of space rollers, FIGURE 5 is a view of a still further modification in which there is only a single graduated scale on the chart and with the chart driven so as to be movable through a wide angle, FIGURE 6 is a perspective view showing an inversion of the FIGURE 1 modification in which the movable indicator is adjustable rather than the chart, FIGURE 7 is a diagrammatic perspective view showing a modification in which the chart is flexible so that it can be stretched to change the effective length of the scale thereon, FIGURE 8 is a diagrammatic view showing how my invention can be adapted to an electrical weight indicating system, FIGURE 9 is a more or less diagrammatic view showing the adaptation of my invention to a scale mechanism having a needle rotatable about a central axis on the dial of the instrument, FIGURE 10 is a modification similar to FIGURE 9 but showing a different manner for adjusting the percentage computing chart on the instrument dial, FIGURE 11 is a diagrammatic view showing a scale mechanism of a type having a rotatable drum and being provided with percentage computing scales according to the present invention and indicating means associated therewith, FIGURE 12 is a diagrammatic view showing a chart of the FIGURE 11 modification in developed form, and FIGURE 13 is a modified arrangement wherein the movable indicator element of the scale device swings over a window and into which window there is projected from a film cylinder or film strip an image of the percentage chart.

Referring to the drawings more in detail, the weighing device indicated in FIGURE 1 rather diagrammatically comprises a frame 10 and associated with the frame is a holder 12 for receiving a pan 14. The holder 12 is connected through any suitable and well known mechanism to an indicator arm 16 that is adapted for swinging about its upper end over a chart 18. The indicator on 16 may comprise the frame portion 20 and the wire or ribbon 22, the latter being the index mark which indicates the deflection of the indicator.

A true weight indicating scale 24 may be provided that is fixedly mounted in the frame of the weighing device so that conventional weighing operations can be carried out.

The chart 18, according to this invention, is adjustable relative to indicator arm 16 and in such a manner that the zero indication on the chart is never affected by the adjustment of the chart. This is accomplished by mounting chart 18 so that it is movable in a direction parallel with the indicator arm when the indicator arm occupies its zero position. To this end, chart 18 may be supported on frame 10 in any manner such that it slides only in the direction of the indicator arm in its zero position.

This may be accomplished by supporting chart 18 on frame 10 by screws 26 that pass through slots 28 which are exactly parallel with the zero line 30 extending up the left hand side of the chart. Screws 26 and slots 28 support and guide the chart on frame 10 while movement of the chart is accomplished by a mechanism best seen in FIGURE 2.

In FIGURE 2 it will be noted that there is attached to the back side of the chart a bracket 31 by bolts 32 (seen toward the left of the chart in FIGURE 1) and that this bracket has tabs 34 thereon that screw threadedly receive the threaded rod 36. Rod 36 has its opposite ends supported for free rotation relative to frame 10 while axial movement of the rod is prevented as by the collars 38 that engage the stationary support bracket means 40 that is attached fixedly to frame 10.

The lower end of rod 36 carries a bevel gear 42 that matches with a bevel gear 44 on a shaft 46 that extends out the front of the weighing device and has an adjusting knob 48 thereon.

At this point it will be apparent that rotation of adjusting knob 48 will be accompanied by shifting chart 18 and in a direction parallel with the zero position of indicator arm 16. It will be observed that threaded rod 36, similarly to slots 28, is exactly parallel with the zero position of the indicator arm 16 and the zero line 30 that is common to all of the graduated scales on the chart.

Turning now to FIGURE 3, this view, taken together with FIGURE 1, will show that the chart 18 comprises a plurality of arcuate scales, generally indicated at 50, and each of which scales is graduated from zero to 100 in suitable subdivisions. In practice, the subdivisions will be much finer than are shown in the drawings, and normally, there could be 100 scale marks in each scale so that values as low as 1% could be read directly and fractions of a percent estimated. It will also be evident that by increasing the size of the weighing mechanism the graduations could be finer still.

The scales 50 on the chart are characterized, as previously mentioned, in having a common zero line 30 and in terminating at their 100% mark in such positions that the scale arm 16 in swinging rightwardly across the chart will encounter the 100% marks successively. Because of this, the weight of a sample placed in the pan can vary between relatively wide limits, and the wire or ribbon 22 of the indicator arm will fall close to one of the 100% marks on one of the scales of the chart. The nearest 100% mark on the chart can be caused to coincide exactly with the wire or ribbon 22 by manipulating knob 48 and shifting the chart in the direction of arrow 52 in FIGURE 3.

It will be evident that in any case where the indicator arm falls between the two extreme 100% marks, only a slight shifting of the chart will be necessary to bring the indicator arm into perfect registration with one of the 100% marks.

As will be seen in FIGURES 1 and 3, the graduated scales on chart 18 may be of about the same length, but since they vary in distance from the pivot point of the indicator arm, the graduated scales are, in effect, of different lengths, which provides the primary feature of the present invention of a graduated scale which can have its effective length changed. The various graduated scales on the chart, and which are indicated by letters, are actually different scales but since only one thereof at a time is in use, it will be evident that the invention provides means for changing the effective length of the indicating scale.

In carrying out a work operation such as the grain sampling referred to, the grain sample is placed in the pan 14, and the indicator arm will deflect to a certain point. At that time the chart is adjusted to bring a 100% mark in registration with the wire or ribbon 22. The indicia shown on the chart at 54 in FIGURE 1 together with the pointer 56 adjacent thereto and fixed to the scale frame will indicate the adjusted position of the chart while the letter at the left end of the particular scale being read will identify that scale. Thereafter, the sample is removed from the pan and the trash and foreign matter separated therefrom and the sample is then placed in the pan again. At this time the scale arm will deflect a lesser amount and the percentage of good grain in the sample can be read directly off the particular scale being used and without any computation whatsoever.

Should other weighing operations be carried out between the time the sample is initially weighed and it is brought back for the second weighing, the chart can always be adjusted back to the position it occupied on the original weighing by reference to the indicia 54 and then by using the same lettered scale, the proper reading of the percentage of good grain will be had.

In making up a batch, say, of chemicals or the like in a laboratory, the proper percentages of the various ingredients can be supplied merely by selecting any of the scales, and placing the ingredients therein in an amount to cause deflection of the indicator arm the proper amount.

Various modifications within the scope of my invention can be made in the weighing device and some thereof are illustrated in FIGURES 4 through 8.

In FIGURE 4 the indicator arm 60 swings so that the hair line thereof remains parallel to a given reference line at all times. The chart 62 is wound up on the rollers 64 which are connected by gears 66 and adapted for being driven by an adjusting knob 68 so that the position of the chart can be shifted. The chart has a plurality of graduated scales 70 thereon which vary in length so that when the pan of the weighing device is loaded, the knob 68 can be availed of to roll the chart until the indicator arm registers with a 100% indicia on one of the scales. At this time the particular graduated scale being utilized will be indicated by the letter associated with the left end thereof while the vernier adjustment of the chart can be indicated by the numbered indicia 72 which are stationary in the frame of the device, as by being marked on the cover glass.

It will be evident that the FIGURE 4 modification, as before, provides means for changing the effective length of the scale over which the indicator arm moves while providing means for indicating the actual position of the chart so that the setting of the chart can be duplicated, should it be so desired.

In FIGURE 5 a modification is illustrated in which there is only a single graduated scale 74, and it is inscribed on a bar-like chart 76 pivoted at 78 on a point that is on the zero line when the pan of the weighing device is unloaded.

In order to provide for extreme variations in the effective length of scale 74, the chart 76 is adapted for movement through an angle of about 90° and there is indicia 80 associated therewith that runs over an arcuate numbered scale 82, and which, as before, provides a ready means for duplicating any setting of the indicating portion of the scale mechanism.

The FIGURE 5 modification may also include a true weight indicating scale 84, if so desired.

In FIGURE 6 I illustrate what amounts to an inversion of the FIGURE 1 modification, because in FIGURE 6 the chart 86 is stationarily mounted but is provided with a plurality of percentage scales 88 which are substantially identical with those of the FIGURE 1 modification. In FIGURE 6 the indicator arm 90 is mounted on a shaft 92 carried in a bracket 94 that threadedly engages adjusting rod 96. By rotating rod 96 the indicator arm can be adjusted relative to the chart. The rod 96 extends exactly parallel with the zero line 98 on the chart so that adjustments of the indicator arm do not affect the zero position thereof.

For driving the indicator arm in its several adjusted positions, the bevel gearing 100 may be employed, one of the bevel gears being on shaft 92 and the other being connected with a shaft 102 extending parallel with rod 96 by a feathered key. Shaft 102 is driven by the weighing mechanism similarly as the indicator arm 16 in FIGURE 1.

It will be evident that the adjustment of the indicator arm in FIGURE 6 will accomplish exactly the same results as the adjustment of the chart in FIGURE 1. The indication of the setting of the indicator arm is obtained by the pointer 104 carried on bracket 94 which indicates the setting of the indicator arm by the numbered scale 106 on chart 86.

In FIGURE 7 a modification is shown wherein the effective length of the graduated scale is changed by actually changing the length of the chart itself. This is accomplished by printing the percentage scale on a flexible extensible element 108 which has its zero end anchored at 110 and at a point adjacent the 100% mark connected with a member 112 that screw threadedly engages adjusting screw 114 that has knob 116. A pointer 118 is movable over the numbered scale 120 to indicate the adjustment of the chart.

In the FIGURE 7 modification the chart is actually stretched or permitted to shrink due to its own resilience and by suitably shaping the member from which the chart 108 is made, it can be made to expand substantially linearly throughout its entire length whereby the spacing between the individual indicia on the chart will remain uniform.

While a flexible member such as a rubberlike element or elastic element is illustrated, it will be evident that the FIGURE 7 modification could also utilize a coiled spring and equivalent results would obtain.

In FIGURE 8 there is illustrated an arrangement wherein an electrical indicating instrument 120, which may, for example, be a milliammeter 120 having a scale graduated from zero to 100. This instrument is connected through an adjustable resistor 122 with a movable contact point 124 adapted for sliding on the potentiometer resistor 126. When the pan 128 is unloaded, the contact 124 is at the point of zero potential on resistor 126 and the instrument 120 indicates zero. When the pan is loaded, contact 124 slides upwardly along resistor 126 to a point of higher potential thereon, as caused by battery 130, and the instrument needle will then be deflected. The instrument needle is then caused to register with the 100 mark on the scale by adjustment of the movable contact 132 of resistor 122. Thereafter, when the sample in the pan is removed and the trash taken therefrom, reweighing of the remaining part of the sample will provide for an indication by the instrument of the true percent that the remaining portion is of the original sample. The adjustment of contact point 132 may be noted on the numbered scale 134 associated therewith.

From the foregoing it will be apparent that the present invention provides for a weighing mechanism which can be constructed extremely simply in order to carry out work operations of the nature described and that all computations ordinarily accompanying such operations and all critical weighing steps are eliminated. In every case this is accomplished by changing the effective length of the graduated scale, either by selection of a predetermined scale from a family of scales, or by actual adjustment of the position or actual length of the scale being employed.

In the FIGURE 8 modification while no actual change or adjustment is made in the graduated scale, the length thereof is effectively changed by the provision of the adjustable resistor 122 which acts as a multiplying element to change the deflection of the instrument pointer whereby the effective length of the scale on the instrument chart is changed.

In every case the essential feature of the present invention is provided that there is absolutely no change in the indication of the weighing device when the load pan is empty. This is true regardless of the position of any of the adjustable elements associated with the weighing device whether the adjustment pertains to the chart or to the indicator arm or to the amount of deflection of the indicator arm as provided in FIGURE 8.

The present invention is adaptable to other types of weight indicating mechanisms, and in FIGURE 9, for example, there is shown a modification wherein the weighing device includes a circular dial 150 which may have the weight indicating indicia 152 thereon. A pointer 154 is rotatable over the dial as the scale pan (not shown) is loaded.

According to the present invention a precentage computing chart 156 is pviotally supported on dial 150 at pivot point 158 and is swingable about the pivot point to various positions as indicated by the scale 160 and is adapted for being clamped in various positions by a central clamp nut 162. The percentage indicating chart comprises a plurality of individually graduated scales 164, each of which has its zero point at the pivot point of pivot pin 158, and the several scales terminate at different points angularly spaced about the percentage computing chart so that for substantially any deflection of pointer 154 into the region of the lower half of the dial, the percentage computing dial can be adjusted to cause one of the terminal points of the scales 164 to coincide therewith. In a manner already described this permits ready computation of the percentage component parts of the sample being tested.

In FIGURE 10 is a similar arrangement except that there is mounted on the weight indicating chart 170 a percentage computing chart 172 and which chart is vertically movable on the weighing indicating chart by means of the slot and clamp nut 174. The percentage computing chart has a plurality of scales 176 thereon graduated from zero to 100, each having its zero point coinciding with a vertical line passing through the zero point of the weight indicating chart, and with the opposite ends of the scales terminating at different angular positions about the percentage computing chart.

Similarly as before, when a sample is placed in the pan of the weighing device associated with the FIGURE 10 structure, the indicating needle 178 thereof will deflect and whereupon the percentage computing chart can be adjusted to cause one of the 100 designations of the scales 176 to coincide with the pointer, the setting of the percentage scale being indicated by the indicia 180, and thereafter direct indications of the percentage component parts of the sample being weighed can be had.

In FIGURE 11 there is shown a drum 190 rotatable as the pan of the associated scale is loaded to cause the weight indicating indicia 192 on the drum to travel past stationary hair line 194. The drum is also provided with a plurality of spiral lines 196, shown in developed form in FIGURE 12, and each of these lines commences from the zero point on the drum and spirals about the drum to the opposite end. The lines are marked from zero to 100, as indicated in FIGURE 12, and this permits an exact indication of 100 to be given by the slider 198 when the drum is rotated to a deflected position. After the slider 198 has been set so that its hair line 200 crosses hair line 194 directly over the 100 percent mark, the percentage component parts of the sample can be read directly beneath the intersection of the hair lines as the component parts are returned to the weighing pan of the scale as previously described.

In FIGURE 13 there is shown an arrangement wherein a pointer 202 is provided swingable over a window 204 that may carry weight indicating indicia 206. Window 204 is preferably of ground glass or translucent plastic and located behind the window is a lens system 206 through which there is focused on window 204 a suitable graduated scale from the movable or rotatable printed film element 208 behind which there is positioned the light source 210.

As to the FIGURE 13 modification, the film could be the movable element of the weighing mechanism, if so desired, by printing the chart in the manner illustrated in FIGURES 11 and 12. With this arrangement the scale indications in the window would move past a fixed line rather than having a movable indicator as at 202 moving past a fixed projected image of a graduated scale.

Many modifications within the purview of the present invention may be made while still retaining the inventive thought characterizing the modifications that have been described in detail. For example, automatic scale mechanisms of the self-balancing type could be employed wherein the automatic feature of the scale could be utilized for initially positioning a graduated dial or wherein the self-balancing feature took the form of causing the element of the mechanism corresponding to the deflectable pointer to come to rest at a predetermined position on a suitable percentage scale.

The electrical modification illustrated in FIGURE 8 is also merely exemplary of many different forms which such an electrical scale mechanism might take. For example, the scale mechanism could be electronic or could utilize a load cell, for example, of the strain gauge type, and for delicate operations the load sensitive element could be arranged in a bridge circuit.

The several mechanisms illustrated have all been of at least the semi-automatic type, in that a weight placed in a load receiving pan would bring about deflection of a pointer or movement of a film strip or the like. However, the present invention is also adaptable for hand operated scale mechanisms in which the balance of the weighing device is set by manually manipulating weights. In such case, the principles of the present invention could still be employed by having either a plurality of graduated percentage scales for cooperation with the manually adjustable weight, or a single graduated percentage scale with the adjustable balancing weight being variable as to weight so that with the balancing weight set at the 100 point on the percentage scale, a balance of the weighing device could be arrived at.

It will be understood that this invention is susceptible to modification in order to adapt it to different usages and conditions; and, accordingly, it is desired to comprehend such modifications within this invention as may fall within the scope of the appended claims.

I claim:
1. In a percentage indicating weighing apparatus for a sample of material to determine the percentage of the total weight of a fractional portion thereof, a weight pan, an indicator arm swingable in response to movements of the pan caused by the placing therein of a sample or the like, a chart over which the indicator arm swings, said chart comprising a plurality of percentage graduated scales arranged in spaced relation lengthwise of the indicator arm and all of said scales having a common zero line with which the indicator arm registers when the pan is unloaded, each said graduated scale being graduated from zero to 100 and the 100 indications on said scales being so arranged that as the indicator arm moves across the chart it registers percentages successively therewith, and means operable for shifting said chart in the direction of the said zero line thereon whereby the indicator arm can be caused to register exactly with one of the said 100 marks when it is positioned any place between the two extreme 100 marks when the pan is loaded, there being indicator means for indicating the adjusted position of said chart whereby the relative positions of said chart and indicator arm can be reproduced at any time.

2. In a percentage indicating weighing apparatus for a sample of material to determine the percentage of the total weight of a fractional portion thereof, a weight pan, a pivoted indicator arm connected with the weight pan and movable in response to movements of the pan as caused by the weight of a sample or the like placed therein, a chart over which the indicator swings, said chart having a plurality of percentage graduated scales thereon spaced in the direction of the length of said indicator arm and radially with reference to the pivotal support of the arm, said scales having a common zero line with which the indicator arm registers when the weight pan is under no load, each said scale being correspondingly graduated from zero to 100 and the lengths of said scales being such that the indicator arm registers percentages successively with the 100 indications thereof as it moves across said chart, said scales having individual identifying indicia pertaining thereto, means for adjusting one of said indicator arm and chart in a direction parallel with the direction of the said zero line to bring the said arm when the pan is loaded into registration with one of said 100 indications, and an auxiliary scale and pointer means between the chart and indicator arm for indicating the adjusted relative position thereof.

3. In a percentage indicating weighing apparatus for a sample of material to determine the percentage of the total weight of a fractional portion thereof, a weight pan, a frame for movably supporting said weight pan and adapted for deflection in proportion to the weight placed therein, an indicator arm pivoted in the frame connected with the pan for movement in synchronism therewith, a chart over which the indicator arm swings, said chart having a plurality of graduated scales thereon of substantially the same length, each scale beam graduated from a common zero to 100 and said scales being located on the chart in radially spaced relation about the pivot axis of said indicator arm, said scales having said common zero line with which said indicator arm registers when said pan is unloaded, means supporting said chart on the frame for movement thereon in exact parallelism with said common zero line so said chart can be moved when the pan is loaded to bring the indicator arm into registration with the maximum point of one of the scales, a manually adjusted screw connected between the frame and the chart for adjusting the chart on the frame, an auxiliary scale on one of said frame and chart parallel to the direction of movement of the chart, and a pointer on the other of said frame and chart cooperating with said auxiliary scale whereby the position of the chart on the frame is indicated.

References Cited in the file of this patent
UNITED STATES PATENTS

| | | |
|---|---|---|
| 738,475 | Palmer | Sept. 8, 1903 |
| 1,136,694 | Michalis et al. | Apr. 20, 1915 |
| 1,504,333 | Fear | Aug. 12, 1924 |
| 1,676,052 | Rogers | July 3, 1928 |
| 1,717,502 | Folker | June 18, 1929 |
| 1,855,928 | Sherer | Apr. 26, 1932 |
| 1,939,091 | Von Pein | Dec. 12, 1933 |
| 1,941,981 | Fontaine | Jan. 2, 1934 |
| 2,303,010 | Walter | Nov. 24, 1942 |
| 2,316,230 | Endres | Apr. 13, 1943 |